May 26, 1964 D. FIRTH 3,134,268
PULLEY AND HUB CONSTRUCTION
Filed Feb. 26, 1962 4 Sheets-Sheet 1

INVENTOR.
DAVID FIRTH
BY Hobbs & Caston
ATTORNEYS

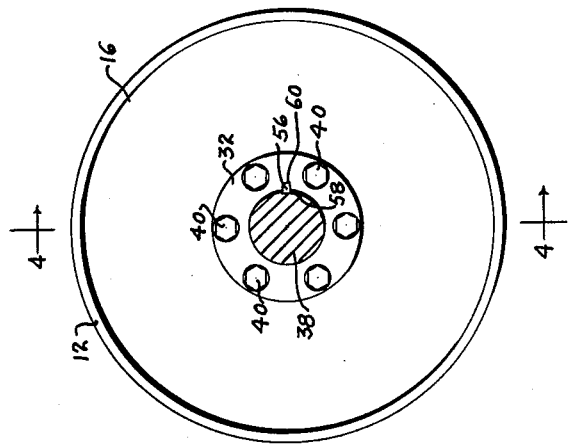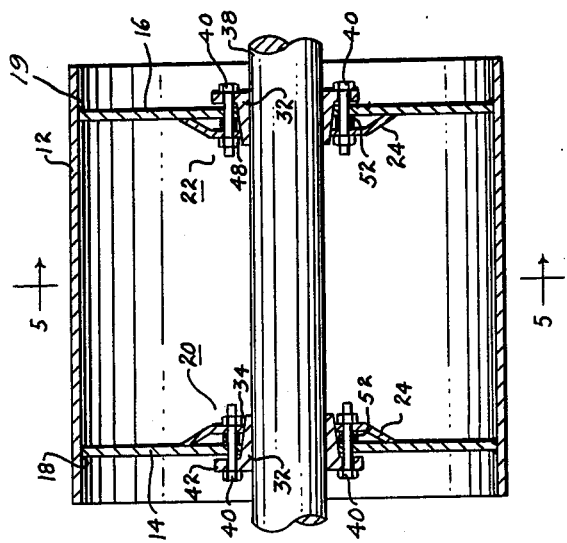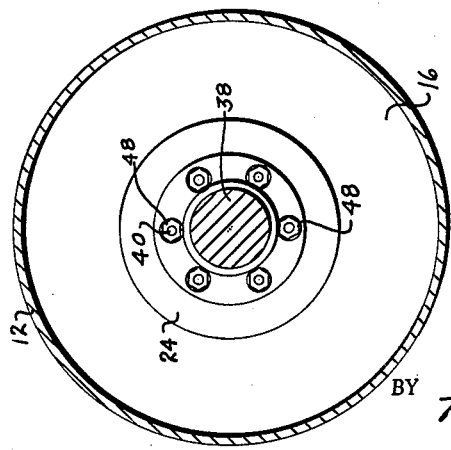

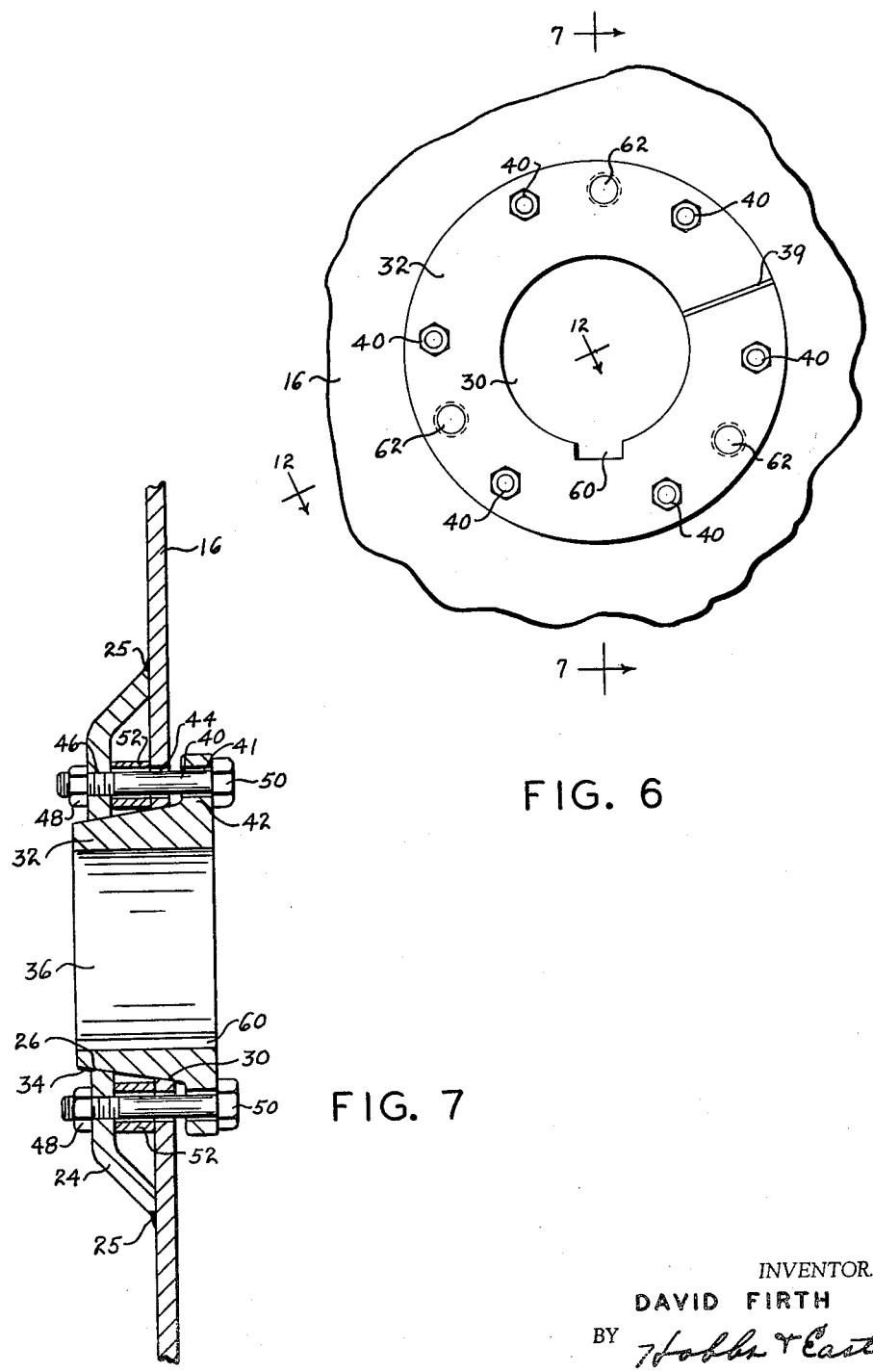

May 26, 1964 D. FIRTH 3,134,268
PULLEY AND HUB CONSTRUCTION
Filed Feb. 26, 1962 4 Sheets-Sheet 4

INVENTOR.
DAVID FIRTH
BY Hobbs & Carton
ATTORNEYS

United States Patent Office 3,134,268
Patented May 26, 1964

3,134,268
PULLEY AND HUB CONSTRUCTION
David Firth, South Bend, Ind., assignor to Dodge Manufacturing Corporation, Mishawaka, Ind., a corporation of Indiana
Filed Feb. 26, 1962, Ser. No. 175,765
5 Claims. (Cl. 74—230.4)

The present invention relates to pulleys and more particularly to a hub and bushing construction for conveyor pulleys and the like.

A conveyor pulley construction in extensive use today consists of a cylindrically-shaped steel rim and steel end discs usually recessed and welded in place in the ends of the cylindrical rim and containing a hub and bushing mounted on a rotatable shaft. These pulleys are often large and designed for heavy duty and are required for extended periods of time to carry heavy loads which tend to distort and constantly flex the shaft and end discs, setting up fatigue stresses in the end discs and in the joints between the end discs and the hub or bushing and between the disc and the rim, ultimately resulting in failure of or serious damage to the pulley and hub structures. Various types of hubs have been developed and used in conjunction with this type of conveyor pulley, including those mounted permanently in or on the end discs and those adapted to be assembled and secured in operating position when the pulley is installed and disassembled and removed from the pulley when the pulley is removed from the conveyor mechanism. These prior hubs have in general been either costly to manufacture and install or unsatisfactory in operation under heavy loads because of a tendency to concentrate the fatigue stresses in limited areas in the end discs or in the joints between the end discs and the rim or hub. To overcome these difficulties, in the past the pulley structures, particularly the end discs, have been reinforced in the areas of greatest stress, thus resulting in increased weight of the pulley and fabricating costs, or the hub has been constructed to permit the flexing of the end discs in a manner to minimize the effect of the stress on the pulley, resulting in weakening of the pulley structure.

One of the primary objects of the present invention is to provide a pulley and hub construction which absorbs and distributes the stresses created by excess loads on the pulley over a relatively large area in the end discs to minimize the adverse effect of the stresses on the discs and joints between the rim and respective hubs, and which is of sufficient strength to eliminate or substantially reduce flexing and distortion in the end discs.

Another object of the invention is to provide a pulley of the aforesaid type having a hub construction combined as a part of the end discs in such a manner that the stresses to which the pulley is subjected during operation under load are distributed uniformly over a substantial area of the end discs rather than being concentrated in a confined or limited area or at focal points as in the conventional pulleys of the present type.

Still another object of the present invention is to provide in combination with the end discs of the aforementioned type of pulley a relatively simple and versatile hub structure having a split-tapered bushing which seats in the center opening of the discs in firm contact with the inner edge thereof and contracts into firm engagement with the shaft to secure the pulley thereon.

A further object is to provide a hub structure for pulleys of the aforesaid type which is so constructed and designed that it can be easily fabricated with standard equipment and readily assembled in place on the pulley end discs without the use of any special tools or equipment, and which can be incorporated in the conventional conveyor pulley without any substantial changes being required in the pulley structure.

Additional objects and advantages of the present invention will become apparent from the following description and accompanying drawings, wherein:

FIGURE 3 is an end elevational view of the pulley shown in FIGURE 1;

FIGURE 4 is a vertical cross sectional view of the pulley shown in FIGURE 3, the section being taken on line 4—4 of the latter figure;

FIGURE 5 is a transverse cross sectional view of the pulley shown in the preceding figures, the section being taken on line 5—5 of FIGURE 4;

FIGURE 6 is an enlarged fragmentary end elevational view of the present pulley hub, showing a portion of the pulley end disc and the hub mounted therein;

FIGURE 7 is an enlarged fragmentary cross sectional view of the present hub showing it mounted in an end disc of a pulley;

Figure 1:
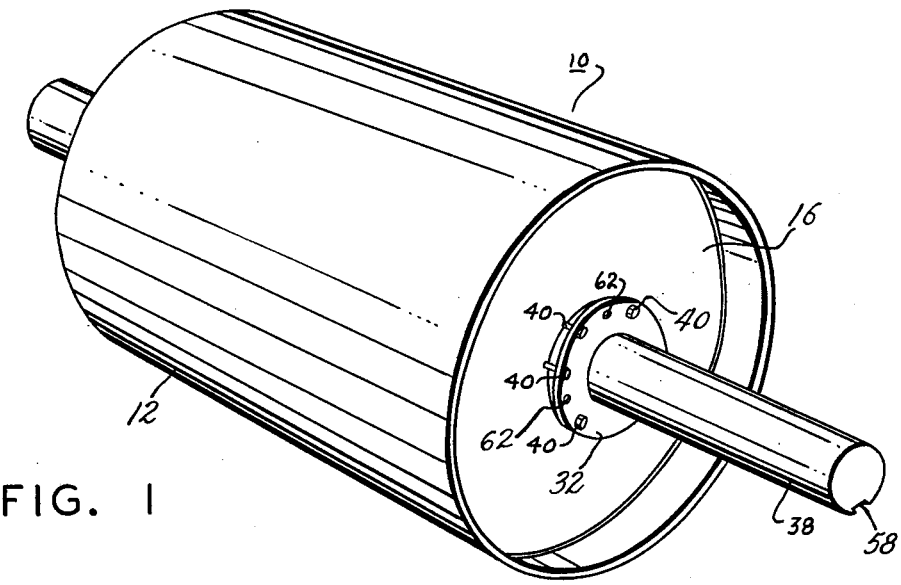
FIGURE 1 is an isometric view of a pulley having the present hub structure installed therein and being mounted on a shaft in operative position.
Figure 2:
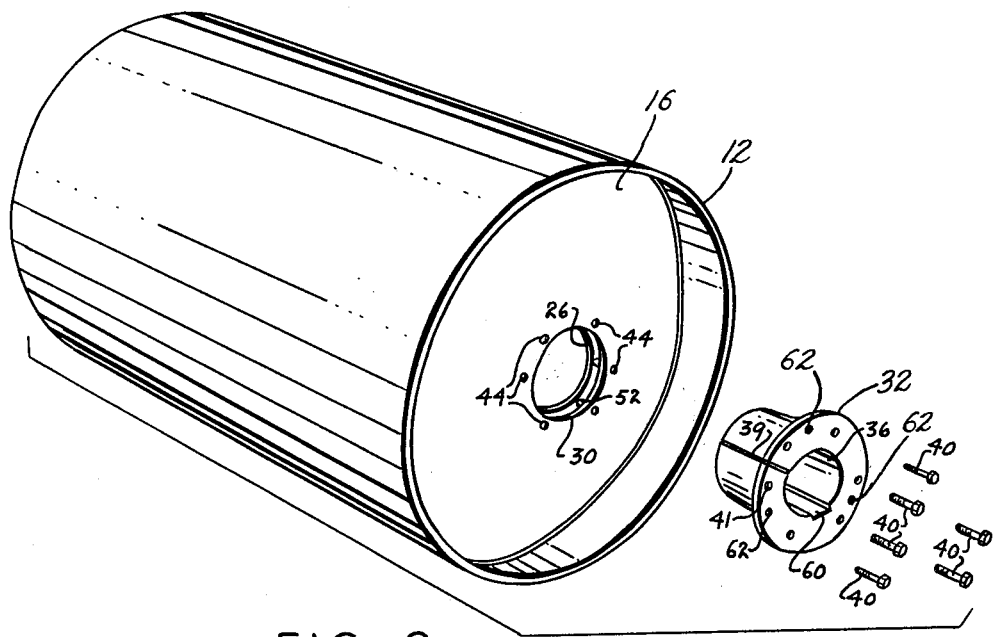
FIGURE 2 is an exploded isometric view of the pulley embodying the present hub structure, showing the hub bushing and the bolts for assembling the bushing in the pulley hub.

Referring more specifically to the drawings, numeral 10 designates generally the present pulley designed primarily for use in belt conveyors, numeral 12 designates the rim of the pulley, 14 one end disc, and 16 the other end disc of the pulley, the two end discs being recessed inwardly from the respective ends of rim 12 and secured therein by welding, as shown at numerals 18 and 19, or by other suitable means. The rim 12 may have a straight or crowned face and may be of a variety of different lengths and, if necessary, reinforced internally by spaced discs or other suitable members to meet strength requirements. The structure of the pulley thus far described is conventional and may be varied from one type of installation to another.

The present pulley hubs designated by numerals 20 and 22 are mounted on end discs 14 and 16, respectively, each hub consisting of a frusto-conically shaped plate or member 24 secured by welding, as shown at numeral 25, to the inner surface of the end discs and having an opening 26 at its center, this opening being somewhat smaller in diameter and concentric with center hole 30 in the disc. Member 24 is rigidly joined at its outer edge to the end disc and is spaced from the end discs near the center thereof at opening 30. While member or plate 24 is referred to as being frusto-conical, it may be other shapes, including a disc-shaped structure with peripheral or marginal members connecting to the end disc, or a spider-shaped structure with legs thereof joined to the end disc.

A bushing 32 having inwardly tapered external surface 34 is seated in openings 26 and 30 and contains a center bore 36 for receiving a shaft 38. The edges of plate 24 and discs 14 and 16 defining openings 26 and 30, respectively, are tapered to correspond to taper 34 on the bushing to prevent scoring of the bushing and to provide a firm seat therefor. The bushing, which is provided with a longitudinal slot 39 extending completely through one side thereof, is secured in the two openings and on the shaft by a plurality of bolts 40, extending through holes 41 in radial flange 42 on the external side of bushing 32 and through holes 44 and 46 near the inner edge of the end discs and near the inner edge of member 24. The bolts 40 are secured in place by nuts 48 on the inner side of member 24, welded or otherwise secured in place at holes 46 in order to facilitate assembling the bushing in the end discs. As bolts 40 are tightened by the use of a wrench on heads 50, the bushing is urged inwardly into openings 26 and 30, thereby causing tapered surface 34 to firmly engage the inner edges of the end discs and member 24, and, upon further tightening of the bolts, causing the split bushing to contract and firmly engage shaft 38. In order to prevent the inner edge of member 24 from being deflected toward the end discs when the bolts are tightened, sleeves 52 are placed between the end plate and member 24 around each hole 44 and 46, and secured permanently in place by welding or other suitable means.

Figure 9:
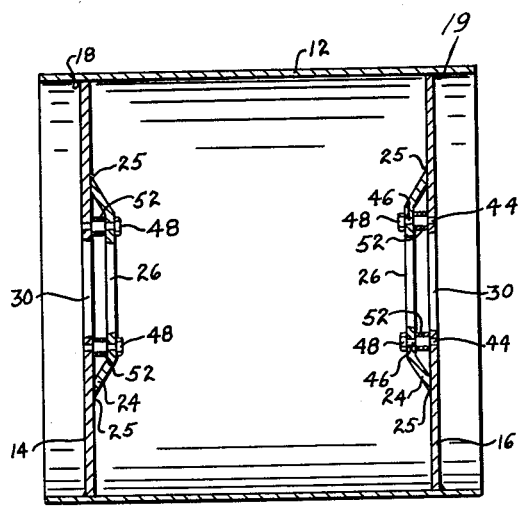
FIGURE 9 is a vertical cross sectional view of the pulley shown in FIGURE 8, taken on line 9—9 of FIGURE 8.
Figure 8:
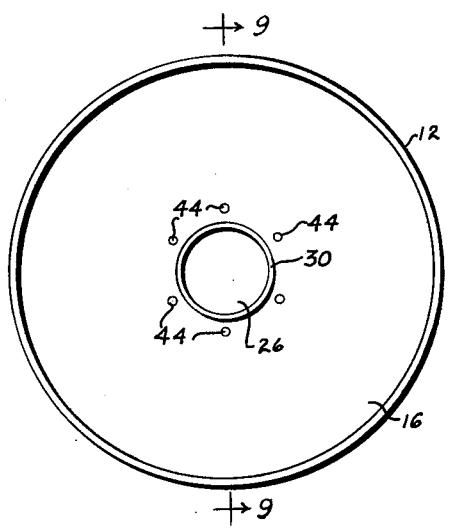
FIGURE 8 is an end view of the pulley shown in the preceding figures with the bushing of the present hub removed therefrom.

When an installation is to be made using a pulley embodying the present hub structure, the pulley in the form shown in FIGURES 8 and 9 is placed on the shaft, and a bushing 32 is slipped loosely on the shaft and into holes 26 and 30 of member 24 and end plates 14 and 16. After the bushing has been assembled in this manner, bolts 40 are inserted through holes 41 of flange 42, and holes 44 and 46 of the respective end discs and members 24, and thereafter threaded into and sufficiently tightened in nuts 48 to securely seat the bushing against the inner edges of member 24 and the respective end plate and into firm engagement with the shaft. In addition to the gripping action of the bushing on the shaft, the bushing is preferably locked against relative rotation on the shaft by a key 56 and key-ways 58 and 60 in the shaft and bushing respectively.

In order to assist in disassembling the bushing from the shaft and from the end discs and member 24, three threaded openings 62 are provided in flange 42 and bolts 64 are threaded through these openings until the inner ends thereof engage the external surface of the end discs. Further tightening of bolts 64 forces bushing 32 outwardly along shaft 38, thereby disengaging tapered surface 34 from the inner edges of the end discs and member 24 and permitting the bushing to expand and slide freely on the shaft.

Figure 10:
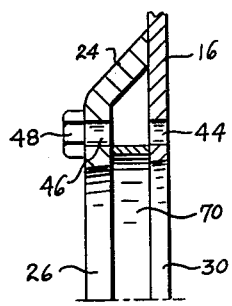
FIGURE 10 is an enlarged fragmentary cross sectional view of a portion of the present hub structure showing a modified form thereof.

A modified form of the present hub is illustrated in FIGURE 10, wherein member 24 is held in spaced relation from the end discs by an annular reinforcing member 70 which circumscribes openings 26 and 30 in the end discs and member 24. Annular member 70 is preferably secured in place by welding at two or more places around its periphery. The structure of the modification shown in FIGURE 10 is otherwise the same as that previously described herein.

Figure 11:
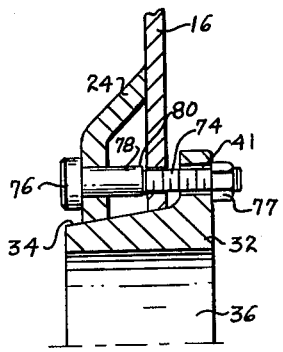
FIGURE 11 is an enlarged fragmentary cross sectional view of the present hub structure showing a still further modified form thereof.
Figure 12:
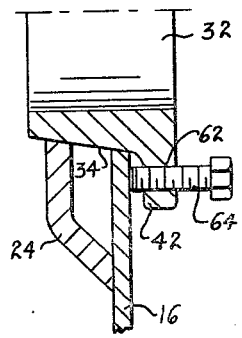
FIGURE 12 is a fragmentary cross sectional view of the present hub taken on line 12—12 of FIGURE 6 illustrating the manner in which the hub is disassembled from the end disc of the pulley.

In the modification of the present hub shown in FIGURE 11, bolts 74 extend through holes 44 and 46 with the head 76 on the internal side of member 24 and the threaded portion thereof projecting outwardly beyond the external surface of the end discs. The bolts are welded or otherwise secured to member 24 or the end discs. In order to prevent deflection of the inner edges of member 24 and the end discs toward one another when the nuts 77 are tightened, an enlarged portion 78 is provided on the bolt to form a shoulder 80 which seats on the end discs around hole 44. The remaining portion of the modified hub structure shown in FIGURE 11 is the same as that shown in the previous figures, and upon the tightening of nuts 77, the tapered surface 34 of the hub is forced inwardly into engagement with the inner edges of member 24, the end discs thereby contracting the split hub into firm engagement with the shaft.

One of the important advantages of the present construction is the fact that plate 24 distributes the stresses created during the operation of the pulley throughout a relatively large area of the end discs 14 and 16, and thereby prevents failure from fatigue stresses in the end discs and in the joints between the discs and the rim. Plate 24 may be varied in diameter and thickness in order to provide the desired stress distribution from one pulley construction to another. Further, the spacing of plate 24 from the end discs provides a firm and relatively rigid structure for receiving bushing 32, and consequently minimizes the flexing and distortion normally created in the end discs of this type of pulley. Plate 24 may be placed on the external surface of the end discs, and securing means for the bushing other than bolts or studs may be used if desired. Another important feature of the present hub is the simplicity and the ease with which it can be assembled and disassembled, involving only a relatively few separate parts.

While several modifications of the present pulley hub construction have been described in detail herein, other modifications and changes in the hub and pulley construction may be made to satisfy requirements.

I claim:

1. A pulley having a rim and two end discs joined to said rim and having a center opening, a hub construction for each end disc, comprising a member engaging the end disc and having a center opening spaced axially from and being of a smaller diameter than the opening in the disc, spacer means between said disc and member, an axially slidable longitudinally split bushing having a center bore for receiving a shaft and an inwardly tapering external surface for engaging the inner edges of the disc and member around the center openings therein, and means for urging said tapered surface into contact with said inner edges and said bushing into firm engagement with the shaft.

2. A pulley having a rim and two end discs joined to said rim and having a center opening, a hub construction for each end disc, comprising a member engaging the end disc and having a center opening of a different diameter than the opening in said disc, the inner edges of the disc and member surrounding said openings being spaced axially from one another, a plurality of spaced holes in the disc around said opening, a plurality of spaced holes in said member around said opening in alignment with the holes in the disc, an axially slidable bushing having a center bore for receiving a shaft and a tapered external surface for engaging the inner edges of the disc and member around the center openings therein, an abutment on said bushing having a plurality of holes therein in alignment with the holes in the disc and said member, and means extending through said holes for urging said tapered surface into contact with said inner edges and said bushing into firm engagement with the shaft.

3. A pulley having a rim and two end discs joined to said rim and having a center opening, a hub construction for each end disc, comprising a plate engaging the inner surface of the end disc and having a center opening of a smaller diameter than the opening in said disc, the inner edges of the disc and plate surrounding said openings being spaced axially from one another, a plurality of spaced holes in the disc around said opening, a plurality of spaced holes in said plate in alignment with the holes in the disc, spacer means between said disc and plate and around said holes, an axially slidable longitudinally split bushing having a center bore for receiving a shaft and an inwardly tapering external surface for engaging the inner edges of the disc and plate around the center openings therein, an abutment on the outer end of the bushing having a plurality of holes therein in alignment with the holes in the disc and said plate, and means extending through said holes for urging said tapered surface into contact with said inner edges and said bushing into firm engagement with the shaft.

4. A pulley having a rim and two end discs joined to said rim and having a center opening, a hub construction for each end disc, comprising a frusto-conically shaped plate joined to the inner surface of the end disc in spaced relation to and having an opening concentric with and smaller than the opening in the end disc, a plurality of spaced holes in the disc around said opening, a plurality of spaced holes in said plate around said opening in alignment with the holes in the disc, an axially slidable longitudinally split bushing having a center bore for receiving a shaft and an inwardly tapering external surface for engaging the inner edges of the disc and plate around the center openings therein, an annular flange on the outer end of the bushing having a plurality of holes therein in alignment with the holes in the disc and said plate, and bolts extending through said holes for urging said tapered surface into contact with said inner edges and said bushing into firm engagement with the shaft.

5. A pulley having a rim and two end discs joined to said rim and having a center opening, a hub construction for each end disc, comprising a frusto-conically shaped plate joined to the inner surface of the end disc in spaced relation to and having an opening concentric with and smaller than the opening in the end disc, a plurality of equally spaced holes in the disc around said opening, a plurality of equally spaced holes in said plate around said opening in alignment with the holes in the disc, spacer means between said disc and plate and around said holes, an axially slidable longitudinally split bushing having a center bore for receiving a shaft and an inwardly tapering external surface for engaging the inner edges of the disc and plate around the center openings therein, an annular flange on the outer end of the bushing having a plurality of holes therein in alignment with the holes in the disc and said plate, bolts extending through said holes for urging said tapered surface into contact with said inner edges and said bushing into firm engagement with the shaft, a threaded hole in said annular flange, and a bolt in said hole for engaging the disc and urging the bushing from said openings.

References Cited in the file of this patent

UNITED STATES PATENTS

| | | |
|---|---|---|
| 1,740,087 | Hall | Dec. 17, 1929 |
| 2,710,762 | Whitaker | June 14, 1955 |
| 2,736,205 | Dunne | Feb. 28, 1956 |
| 2,767,590 | Currier | Oct. 23, 1956 |